United States Patent [19]

Raymo

[11] Patent Number: 5,779,884
[45] Date of Patent: Jul. 14, 1998

[54] AUTOMATIC WATER CHANGING SYSTEM AND APPARATUS FOR AQUARIUMS

[76] Inventor: Joseph D. Raymo, 13487 W. Blanchard Rd., Gurnee, Ill. 60031

[21] Appl. No.: 633,426

[22] Filed: Apr. 17, 1996

[51] Int. Cl.⁶ .......................... A01K 63/04; A01K 63/06
[52] U.S. Cl. .................. 210/97; 119/264; 119/265; 119/266; 137/142; 137/592; 210/169
[58] Field of Search .................. 119/226, 227, 119/245, 259, 260, 265, 266, 249, 263, 269, 261, 264; 137/123, 130, 131, 132, 135, 140, 142, 152, 453, 454, 591, 592; 210/95, 97, 136, 169, 416.2, 198.1

[56] References Cited

U.S. PATENT DOCUMENTS

| 545,309 | 8/1895 | Rhind | 137/453 |
|---|---|---|---|
| 1,623,132 | 4/1927 | Pennell et al. | 137/453 |
| 3,734,853 | 5/1973 | Horvath | 210/169 |
| 3,771,544 | 11/1973 | Horvath | 210/169 |
| 3,913,611 | 10/1975 | St. John | 137/453 |
| 3,994,807 | 11/1976 | Macklem | 210/169 |
| 4,036,756 | 7/1977 | Dockery | 137/142 |
| 4,101,607 | 7/1978 | Bart | 119/263 |
| 4,684,462 | 8/1987 | Augustyniak | 119/261 |
| 4,861,465 | 8/1989 | Augustyniak | 119/227 |
| 5,054,424 | 10/1991 | Sy | 119/260 |
| 5,083,587 | 1/1992 | Tarjan | 210/416.2 |
| 5,453,182 | 9/1995 | Kikuta | 210/169 |
| 5,474,673 | 12/1995 | Ludlow | 119/260 |
| 5,486,285 | 1/1996 | Feeney | 137/453 |
| 5,571,409 | 11/1996 | Scarborough | 119/259 |

*Primary Examiner*—Joseph W. Drodge
*Attorney, Agent, or Firm*—Meroni & Meroni

[57] ABSTRACT

An automatic water changing and water leveling system and apparatus is provided for use with an aquarium containing a body of water. The system comprising a water reservoir structure including a housing defining a chamber therewithin for containing fresh water. The water reservoir structure being disposed at a height above the aquarium and in approximate adjacency with an upper surface level of the aquarium water. A discharge assembly mounted to a bottom portion of the water reservoir structure is provided for discharging fresh water from the water reservoir structure into the aquarium when the upper surface level of the aquarium water falls below a predetermined level causing air to be communicated through the discharge assembly and into the chamber of the water reservoir structure allowing fresh water to be discharged. A siphoning system withdraws water from the aquarium by siphoning action thereby controlling the discharging of water from the discharge assembly.

25 Claims, 4 Drawing Sheets

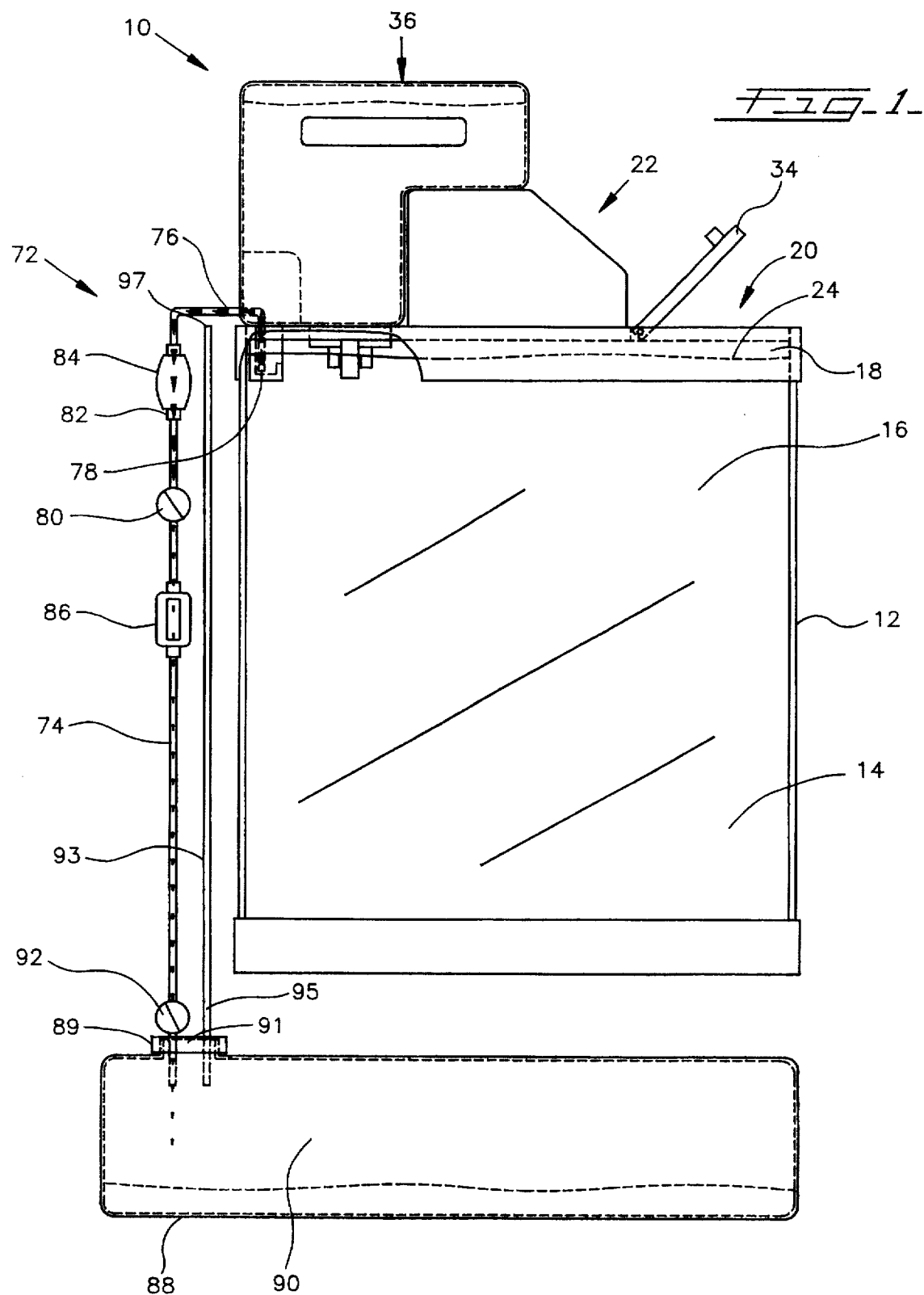

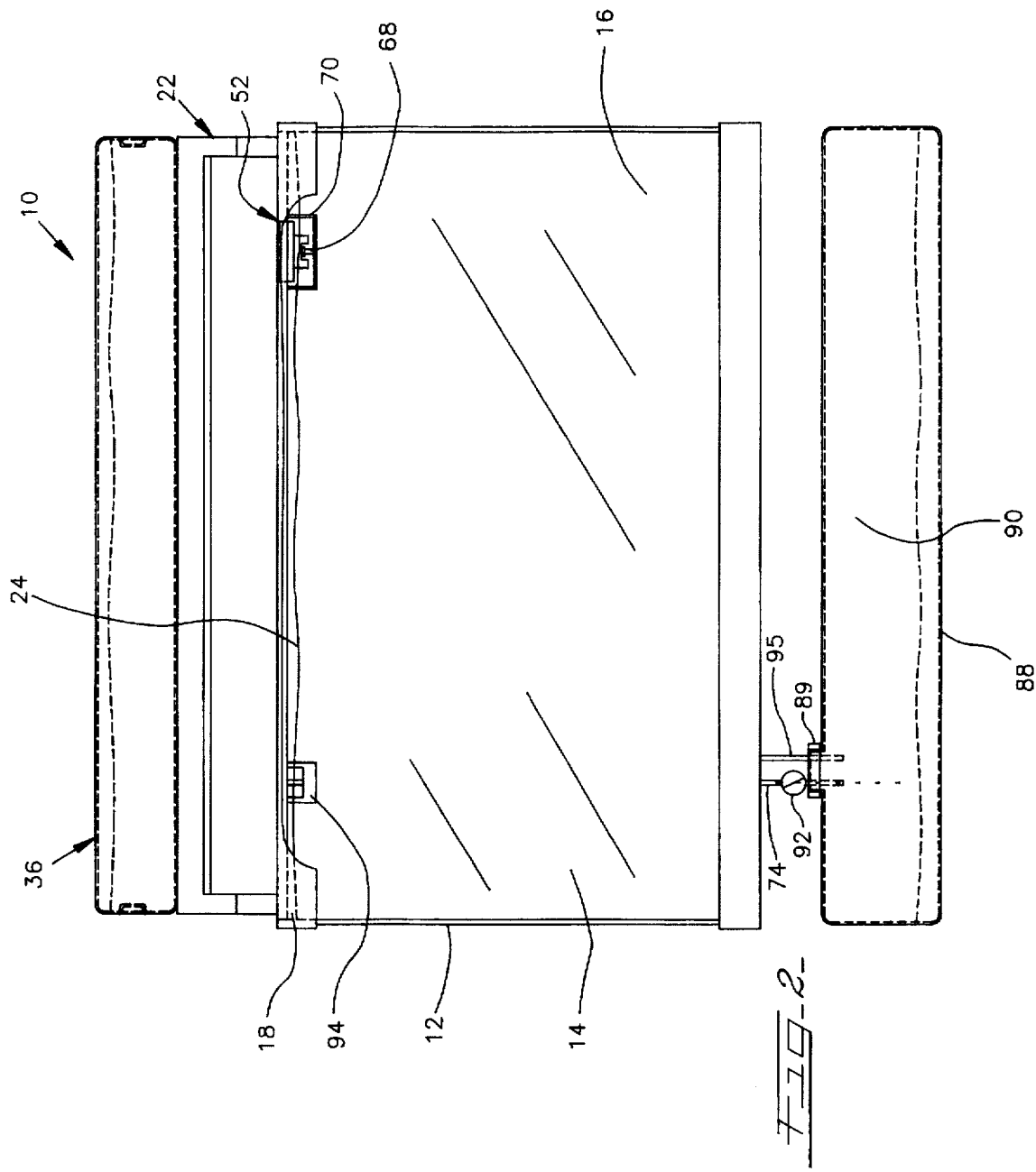

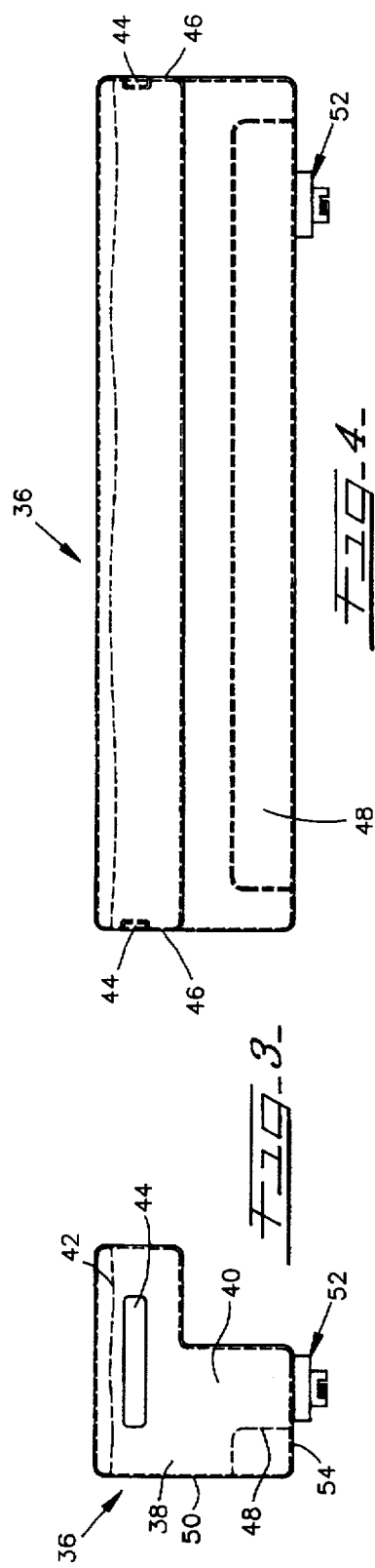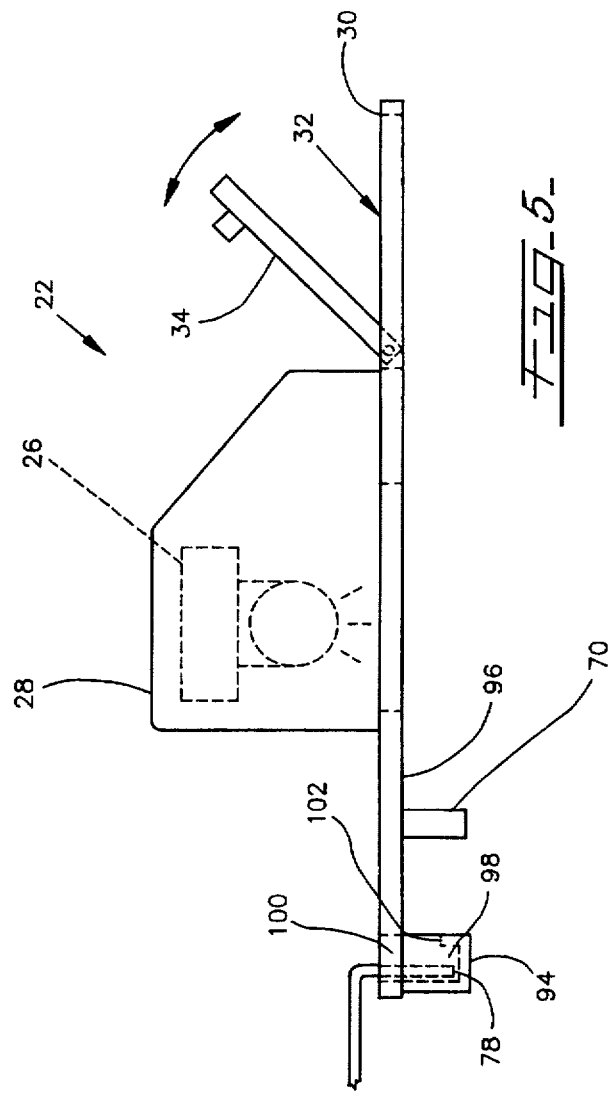

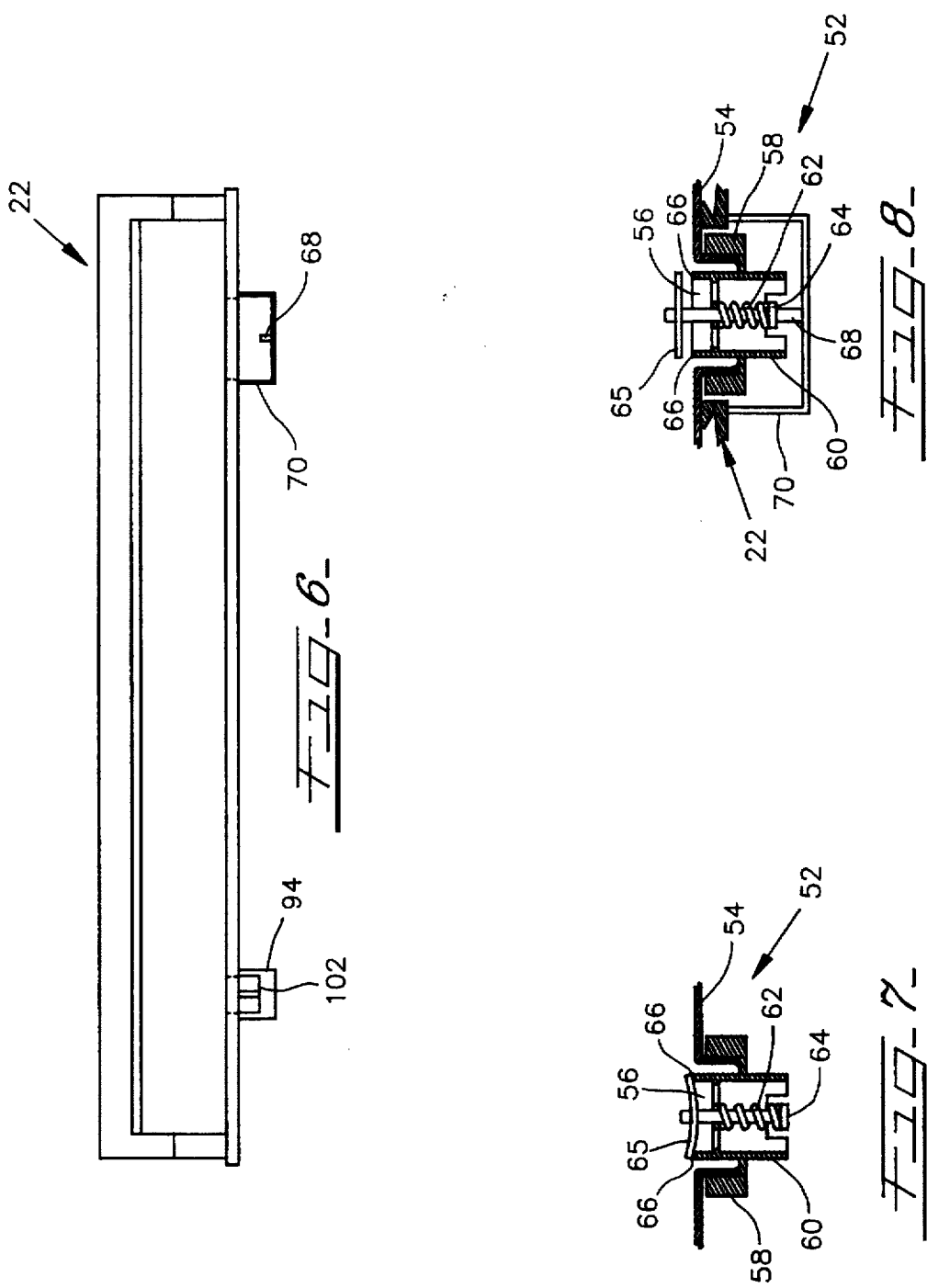

AUTOMATIC WATER CHANGING SYSTEM AND APPARATUS FOR AQUARIUMS

BACKGROUND OF THE INVENTION

1. Field of the Invention

The present invention relates generally to equipment for use in conjunction with aquariums. More particularly, the invention pertains to an automatic water changing and water leveling system and apparatus for aquariums.

2. Description of the Prior Art

Maintaining a healthy ecosystem within an aquarium is essential for the survival of marine and plant life. The weekly task of changing a percentage of the water in an aquarium is known to be one the most important factors in maintaining this ecosystem.

Since there is so little water per fish in an aquarium in comparison to conditions found in nature, the water of an aquarium becomes increasingly polluted or toxic with organic elements which filtration systems will not eliminate. The procedure for a proper water change is time consuming and consequently is often delayed by the aquarist until the ill effects become apparent, such as dead or unhealthy fish, unsightly evaporation and poor water clarity. Often times, water is simply added to eliminate unsightly evaporation, which gives no consideration to the many shocks this delicate environment suffers due to this practice.

Various automated water changing and water leveling systems are known in the art. However, such systems are complex and expensive and typically require electronics, sensors, and pumps, making such systems feasible only with the experienced or commercial aquarist. However, where a great number of aquariums are sold to the novice or "weekend" fishkeeper, the need exists for a simplified system to reduce the time required to properly maintain the aquarium.

As will be described in greater detail hereinafter, the system and apparatus of the present invention differs from those previously proposed and employs a number of novel features that render it highly advantageous over the prior art.

SUMMARY OF THE INVENTION

Accordingly, it is an object of this invention to provide an automatic water changing system and apparatus for changing the water of an aquarium on a regular and continuous basis.

Another object of this invention is to provide automatic water leveling of an aquarium to prevent unsightly evaporation and the accumulation of mineral scale.

Another object of this invention is to provide a system and apparatus that introduces fresh water at a gradual rate so that the temperature of the aquarium is not affected as well as allowing chlorine treated water to be utilized by allowing the chlorine to dissipate through evaporation on a continual basis.

Still another object of this invention is to provide a system and apparatus that is easy to use, can be produced at a low cost, and can be used in conjunction with conventional filters and heaters without interfering with the performance of these products.

Yet another object of this invention is to provide an apparatus that is self-contained and fail-safe.

To achieve the foregoing and other objectives, and in accordance with the purposes of the present invention an automatic water changing and water leveling system is provided for use with an aquarium containing a body of aquarium water. The system comprising a water reservoir structure including a housing defining a chamber therewithin for containing fresh water. The water reservoir structure being disposed at a height above the aquarium and in approximate adjacency with an upper surface level of the aquarium water. A discharge assembly mounted to a bottom portion of the water reservoir structure is provided for discharging fresh water from the water reservoir structure into the aquarium when the upper surface level of the aquarium water falls below a predetermined level causing air to be communicated through the discharge assembly and into the chamber of the water reservoir structure allowing fresh water to be discharged. A siphoning system withdraws water from the aquarium by siphoning action allowing the upper surface level of aquarium water to fall below the predetermined level and thereby controlling the discharging of fresh water from the discharge assembly.

In accordance with an aspect of the invention, an apparatus for automatic water changing and water leveling is provided for use with an aquarium containing a body of aquarium water. The apparatus comprising a hood structure sized and configured for mounting on an aquarium across an open top of the aquarium in approximate horizontal adjacency with an upper surface level of the aquarium water. A water reservoir structure including a housing defining a chamber therewithin for containing fresh water is provided. The water reservoir structure being removably supported by the hood structure for positioning above the upper surface level of the water. A discharge assembly is provided mounted to the water reservoir structure and adapted for extending into the water of the aquarium for discharging fresh water from the water reservoir structure into the aquarium when the upper surface level of the aquarium water falls below a predetermined level causing air to be communicated through said discharge assembly and into the chamber of the water reservoir structure allowing fresh water to be discharged. A siphoning system withdraws water from the aquarium by siphoning action.

In accordance with another aspect of the invention, valve means are provided operatively connected in line with the siphoning system for adjustably controlling the rate of water withdrawal of the siphoning system.

Other objects, features and advantages of the invention will become more readily apparent upon reference to the following description when taken in conjunction with the accompanying drawings, which drawings illustrate several embodiments of the invention.

BRIEF DESCRIPTION OF THE DRAWINGS

In the drawings:

FIG. 1 is a side view of the present invention installed on an aquarium;

FIG. 2 is a front side view of FIG. 1;

FIG. 3 is a side view of a water reservoir structure for use with the present invention;

FIG. 4 is a front side view of FIG. 3;

FIG. 5 is a side view of a hood structure for use with the present invention;

FIG. 6 is a front side view of FIG. 5;

FIG. 7 is an enlarged view of a spring valve assembly in a closed position; and

FIG. 8 is an enlarged view of a spring valve assembly in an open position in engagement with a valve actuator.

DETAILED DESCRIPTION OF THE PREFERRED EMBODIMENT

Referring now to the drawings, an apparatus 10 for automatic water changing and water leveling for use with an aquarium 12 containing a body of water 14 is illustrated in FIGS. 1 and 2.

The aquarium or tank 12 is of conventional design which is generally of rectangular form to define an inner tank chamber 16 which is filled with water 14 and is provided with various marine and plant life. Upper edges 18 of the aquarium 12 define and bound an open top 20 of the aquarium 12.

A hood structure 22 of the present invention is preferable formed of plastic and is sized and configured for mounting on the aquarium 12 across the open top 20 of the aquarium 12 in approximate horizontal adjacency with an upper surface level 24 of the aquarium water 14.

Referring to FIGS. 5 and 6, the hood structure 22 has a lighting assembly 26 of conventional design, such as fluorescent tube lighting, connected to the hood structure 22 within a lighting housing 28 of the hood structure 22 for illuminating the aquarium. A front portion 30 of the hood structure 22 defines a rectangular opening 32 lying within a horizontal plane adjacent to the upper surface level 24 of the water 14 of the aquarium 12. A rectangular access door or panel 34 is pivotally secured to the hood structure in overlaying engagement about the opening 32 to provide a closeable access to the aquarium.

Referring to FIGS. 3 and 4, a water reservoir structure 36 is provided. The structure includes a housing 38 formed of plastic defining a chamber 40 therewithin for containing fresh water 42. The structure has recessed portions 44 on opposite ends 46 of the structure to aid a user in handling the structure when the structure is transported for filling with water 42. An elongated recessed portion 48 provided on a back side 50 of the structure 36, as best illustrated in FIG. 4, creates an accessible opening into the aquarium 12 so that the structure 36 does not conflict with existing aquarium equipment, such as conventional filters and heaters (not shown). It should be understood that a filter assembly or heater could also be formed in combination with the hood structure 22.

The water reservoir structure 36 is removably supported by the hood structure 22 for positioning above the upper surface level 24 of the water 14 in a self-contained combination. A discharge structure 52 is mounted to a bottom portion 54 of the water reservoir structure 36 and is adapted for extending into the water 14 of the aquarium 12 for discharging fresh water 42 from the water reservoir structure 36 into the aquarium 12 when the upper surface level 24 of the aquarium water 14 falls below a predetermined level causing air to be communicated through the discharge structure 52 and into the chamber 40 of the water reservoir structure 36 allowing fresh water 42 to be discharged by nature of displacement. Referring to the drawings, it should be noted that the upper surface level 24 of the water is illustrated at the predetermined level.

Referring now to FIGS. 7 and 8, the water reservoir structure 36 has a discharge outlet 56 in communication with the chamber 40. The discharge structure 52 preferably includes a fill cap 58 removably secured to the discharge outlet 56. The fill cap 58 has spring valve assembly 60 connected thereto for allowing fresh water 42 from the water reservoir structure 36 therethrough when the spring valve assembly 60 is in an open position, as shown in FIG. 8, and for biasing the spring valve assembly 60 in a closed position, as shown in FIG. 7.

The assembly 60 includes a spring 62 for biasing a plunger 64. The plunger 64 has an outwardly extending circular sealing member 65 formed of rubber for biased engagement about an outer edge portion 66 of the discharge outlet 56 to close the discharge outlet 56 when the water reservoir structure 36 is removed from the hood structure 22. A valve actuator 68, shown in FIG. 6, is provided for engagement with the spring valve assembly 60 to actuate the spring valve assembly 60 in an open position by depressing the plunger 64 when the water reservoir structure 36 is placed in supported engagement on the hood structure 22, as shown in FIGS. 2 and 8. The valve actuator 68 is connected to the hood structure 22 by a U-shaped member 70.

Referring to FIG. 1, a siphoning system 72 is provided for withdrawing water from the aquarium by siphoning action. Preferably, the system 72 includes a siphoning tube 74 of conventional design having an inverted U-shaped portion 76 with an end 78 of the inverted U-shaped portion 76 being extendable into the aquarium 12 at a height level below the predetermined level and in close proximity to the water reservoir structure 36. It has been found that improved results are achieved by siphoning water 14 from the aquarium 12 at a level close to the upper surface level 24. For example, the top surface of water in an aquarium is where the highest concentrations of toxic organic elements tend to be located. Further, should the water reservoir structure 36 become empty of fresh water 42, the siphoning actions will then automatically stop.

A valve assembly 80 of conventional design is operatively connected in line with the siphoning tube 74 for adjustably controlling the rate of water withdrawal by the siphoning action. A priming device 82 of conventional design having a rubber priming bulb 84 is operatively connected in line with the siphoning tube for engaging and starting the siphoning action. In yet another alternative embodiment, a sight glass device 86 of the type similarly used in the medical industry for intravenous drip devices is operatively connected in line with the siphoning tube 74 for allowing visual inspection of the flow rate of water withdrawal.

A waste water reservoir structure 88 defining an inner chamber 90 therewithin is adapted to receive discharged water from the siphoning tube 74. A stop valve 92 of known design is connected in line with said siphoning tube 74 for disengaging the withdrawal of water so that the structure may be removed for emptying. The waste water reservoir structure 88 is generally disposed at a height level below the upper surface level of the water so that the siphon action is not diminished.

The waste water reservoir structure 88 preferably has a cap 89 removably secured to an outlet 91 of the structure 88 for sealed engagement with the structure 88. The cap 89 is adapted to receive the siphoning tube 74 therethrough. As an alternative feature, a length of tube 93 may be provided with a first end 95 being extended through the cap 89 in communication with the interior of the structure 88. A second end 97 is extended upwardly to a height above the predetermined water level 24. In use, the tube 93 will eliminate the possibility of overflow in the event that the structure 88 is not emptied when the water reservoir structure 36 is refilled. Since the waste water reservoir structure 88 is sealed, if it becomes overfilled, water will migrate up the tube 93 until it reaches the predetermined level causing the siphoning action to stop. In an alternative embodiment, the siphoning tube 74 can be interconnected directly with a sewer line to eliminate the need for a separate reservoir structure 88.

A skimmer dam structure 94 is connected to a bottom portion 96 of the hood structure 22. The skimmer dam structure 94 defines a skim chamber or pocket 98 having an open top 100. The skim chamber 98 is adapted for containing aquarium water that flows over an upper edge 102 of the skim chamber 98 to collect the upper most level of aquarium water in accordance with the advantages previously stated. The structure 94 extends into the aquarium water 14 with the upper edge 102 being positioned at a height below the predetermined level. The end 78 of the siphoning tube 74 is then inserted within the skim chamber 98 for withdrawing aquarium water.

In operation, as a siphoning action is started by the siphoning system 72 or by manual starting, the top surface of the water is skimmed off at the skimmer dam structure 94 at a rate controlled by the valve assembly 80. The flow rate may be adjusted by the user from visual inspection of the sight glass device 86. Waste water is either stored in the waste water reservoir structure 88 or drained directly into a sanitary sewer.

The system works via a gravity head differential principle. Evaporation and/or the siphoning system will lower the water level in the aquarium below the fill cap 58 allowing air flow into the chamber 40 of the water reservoir structure 36 to allow fresh water 42 to be displaced from the structure 36 into the aquarium 12. When the water level rises above the fill cap 58, the air flow stops, thus stopping the displacement of fresh water 42. Hence, this process also maintains a constant water level with the aquarium at all times and eliminates the possibility of any overflow.

Further, this system is not affected by power failure, since no electricity is needed to operate it. The weekly task of filling the water reservoir structure 36 and emptying the waste water reservoir 88, if utilized, is all that is required to keep the system in operation. It should be understood that for large aquariums multiple water reservoir structures 36 may be employed with the scope of this invention having a size and weight that can be carried by a typical user. Further, it should be noted that by introducing fresh water 42 at this gradual rate, chlorine treated water may be used since the chlorine will have sufficient time to dissipate through evaporation without accumulating to toxic levels.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. An apparatus for automatic water changing and water leveling adapted for use with an aquarium containing a body of aquarium water the apparatus comprising:
  (a) a hood structure sized and configured for mounting on the aquarium across an open top of the aquarium in approximate horizontal adjacency with an upper surface level of the aquarium water;
  (b) a water reservoir structure including a housing defining a chamber therewithin for containing fresh water, the water reservoir structure being removably supported by the hood structure for positioning the water reservoir structure above the upper surface level of the water, and discharge means mounted to a bottom portion of the water reservoir structure and adapted for downwardly extending into the water of the aquarium for discharging fresh water from the water reservoir structure into the aquarium as the upper surface level of the aquarium water falls below a predetermined level and causing air to be communicated through said discharge means and into the chamber of the water reservoir structure allowing fresh water to be discharged; and
  (c) siphoning means for withdrawing water from the aquarium by siphoning action allowing the upper surface level of aquarium water to fall below the predetermined level and thereby controlling the discharging of fresh water from the discharge means.

2. The apparatus of claim 1, further comprising valve means operatively connected in line with said siphoning means for adjustably controlling the rate of water withdrawal of said siphoning means.

3. The apparatus of claim 1, wherein the water reservoir structure has a discharge outlet, the discharge means including a fill cap removably secured to the discharge outlet, the fill cap having spring valve means for allowing fresh water from the water reservoir structure therethrough with the spring valve means in an open position and having means for biasing the spring valve means in a closed position.

4. The apparatus of claim 3, wherein the hood structure has valve actuator means for pressing engagement with said spring valve means to actuate the spring valve means to an open position with the water reservoir structure placed in supported engagement on the hood structure.

5. The apparatus of claim 1, further comprising priming means operatively connected in line with said siphoning means for engaging said siphoning means.

6. The apparatus of claim 1, further comprising means operatively connected in line with said siphoning means for visually inspecting the flow rate of water withdrawal of the siphoning means.

7. The apparatus of claim 1, further comprising lighting means connected to the hood structure for illuminating the aquarium, a front portion of the hood structure defining an opening lying within a horizontal plane adjacent to the upper surface level of the water of the aquarium, the hood structure having an access door pivotally secured to the hood structure in overlaying engagement about the opening.

8. The apparatus of claim 1, further comprising a waste water reservoir structure defining an inner chamber therewithin adapted to receive discharged water from the siphoning means, and valve means connected in line with said siphoning means for disengaging the withdrawal of water from the siphoning means, the waste water reservoir structure being disposed at a height level below the upper surface level of the water.

9. The apparatus of claim 1, wherein the siphoning means includes a skimmer dam structure connected to the hood structure, the skimmer dam structure defining a skim chamber having an open top, the skim chamber being adapted for containing aquarium water that flows over an upper edge of the skim chamber, the structure being adapted for extending into the aquarium water with the upper edge being positioned at a height below the predetermined level, and siphoning tube means for withdrawing aquarium water from the skim chamber by siphoning action.

10. An apparatus for automatic water changing and water leveling adapted for use with an aquarium containing a body of aquarium water the apparatus comprising in combination:
  (a) a hood structure sized and configured for mounting on the aquarium across an open top of the aquarium in approximate horizontal adjacency with an upper surface level of the aquarium water;
  (b) lighting means connected to the hood structure for illuminating the aquarium;
  (c) a water reservoir structure including a housing defining a chamber therewithin, for containing fresh water, the water reservoir structure being removably supported by the hood structure for positioning the water reservoir structure above the upper surface level of the water, and discharge means mounted to a bottom portion of the water reservoir structure and adapted for downwardly extending into the water of the aquarium for discharging fresh water from the water reservoir structure into the aquarium as the upper surface level of the aquarium water falls below a predetermined level and causing air to be communicated through said discharge means and into the chamber of the water reservoir structure allowing fresh water to be discharged;

(d) siphoning means for withdrawing water from the aquarium by siphoning action allowing the upper surface level of aquarium water to fall below the predetermined level and thereby controlling the discharging of fresh water from the discharge means, the siphoning means including a siphoning tube having an inverted U-shaped portion with an end of the inverted U-shaped portion being extendable into the aquarium at a height level below the predetermined level; and (e) valve means operatively connected in line with said siphoning means for adjustably controlling the rate of water withdrawal of said siphoning means.

11. The apparatus of claim 10, wherein the water reservoir structure has a discharge outlet, the discharge means including a fill cap removably secured to the discharge outlet, the fill cap having spring valve means for allowing fresh water from the water reservoir structure therethrough with the spring valve means in an open position and having means for biasing the spring valve means in a closed position.

12. The apparatus of claim 11, wherein the hood structure has valve actuator means for pressing engagement with said spring valve means to actuate the spring valve means to an open position with the water reservoir structure placed in supported engagement on the hood structure.

13. The apparatus of claim 12, further comprising:

(a) priming means operatively connected in line with said siphoning means for engaging said siphoning means; and (b) means operatively connected in line with said siphoning means for visually inspecting the flow rate of water withdrawal of the siphoning means.

14. The apparatus of claim 12, further comprising a waste water reservoir structure defining an inner chamber therewithin adapted to receive discharged water from the siphoning means, valve means connected in line with said siphoning means for disengaging the withdrawal of water from the siphoning means, the waste water reservoir structure being disposed at a height level below the upper surface level of the water, and a tube having a first end in communication with the waste water reservoir structure and a second end extending upwardly above the upper surface level of the aquarium water.

15. The apparatus of claim 14, wherein the siphoning means includes a skimmer dam structure connected to the hood structure, the skimmer dam structure defining a skim chamber having an open top, the skim chamber being adapted for containing aquarium water that flows over an upper edge of the skim chamber and receiving the end of the inverted U-shaped portion of the siphoning tube, the structure being adapted for extending into the aquarium water with the upper edge being positioned at a height below the predetermined level.

16. The apparatus of claim 10, wherein a front portion of the hood structure defines an opening lying within a horizontal plane adjacent to the upper surface level of the water of the aquarium, the hood structure having an access door pivotally secured to the hood structure for overlaying engagement about the opening.

17. The apparatus of claim 10, comprising a combination including the aquarium.

18. An apparatus for automatic water changing and water leveling adapted for use with an aquarium containing a body of aquarium water, the apparatus comprising:

(a) a water reservoir structure including a housing defining a chamber therewithin for containing fresh water, the chamber being sized to horizontally extend across the aquarium, the water reservoir structure being disposed at a height above the aquarium and in approximate vertical adjacency with an upper surface level of the aquarium water;

(b) discharge means mounted to a bottom portion of the water reservoir structure and adapted for downwardly extending into the water of the aquarium for discharging fresh water from the water reservoir structure into the aquarium as the upper surface level of the aquarium water falls below a predetermined level and causing air to be communicated through said discharge means and into the chamber of the water reservoir structure allowing fresh water to be discharged;

(c) siphoning means for withdrawing water from the aquarium by siphoning action allowing the upper surface level of aquarium water to fall below the predetermined level and thereby controlling the discharging of fresh water from the discharge means; and (d) valve means operatively connected in line with said siphoning means for adjustably controlling the rate of water withdrawal of said siphoning means.

19. The system of claim 18, wherein the siphoning means includes including a siphoning tube having an inverted U-shaped portion secured to the aquarium with an end of the inverted U-shaped portion being extendable into the aquarium at a height level below the predetermined level.

20. The system of claim 18, further comprising priming means operatively connected in line with said siphoning means for engaging said siphoning means.

21. The system of claim 18, further comprising means operatively connected in line with said siphoning means for visually inspecting the flow rate of water withdrawal of the siphoning means.

22. The system of claim 18, further comprising a waste water reservoir structure defining an inner chamber therewithin adapted to receive discharged water from the siphoning means, valve means connected in line with said siphoning means for disengaging the withdrawal of water from the siphoning means, the waste water reservoir structure being disposed at a height level below the upper surface level of the water, and a tube having a first end in communication with the waste water reservoir structure and a second end extending upwardly above the upper surface level of the aquarium water.

23. The system of claim 18, wherein the siphoning means includes a siphoning tube having an end for receiving aquarium water in close proximity to the water reservoir structure.

24. An aquarium system adapted to maintain marine life and having a tank containing a body of water, the system comprising:

(a) a water reservoir structure including a housing defining a chamber therewithin for containing fresh water, the water reservoir structure being disposed at a height above the tank and in approximate vertical adjacency with an upper surface level of the body of water; and (b) discharge means mounted to a bottom portion of the water reservoir structure and adapted for downwardly extending into the body of water of the tank for discharging fresh water from the water reservoir structure into the tank as the upper surface level of the body of water falls below a predetermined level and causing air to be communicated through said discharge means and into the chamber of the water reservoir structure allowing fresh water to be discharged.

25. The system of claim 24, further comprising means for causing the upper surface level of body of water to fall below the predetermined level and thereby controlling the discharging of water from the discharge means.

* * * * *